United States Patent [19]
Kuang-Wu

[11] Patent Number: 5,222,848
[45] Date of Patent: Jun. 29, 1993

[54] MULTI-FUNCTIONAL DRILL AND LOCK ASSEMBLY

[76] Inventor: Huang Kuang-Wu, No. 66, Min-Chuan W. Rdy, Taipei, Taiwan

[21] Appl. No.: 845,020

[22] Filed: Mar. 3, 1992

[51] Int. Cl.⁵ .............................................. B25F 3/00
[52] U.S. Cl. ................................. 408/239 R; 7/158; 7/165; 279/905; 408/226
[58] Field of Search ................ 7/158, 165; 408/238, 408/239 R, 241 R, 226; 279/14, 75, 76, 905

[56] References Cited

U.S. PATENT DOCUMENTS

| | | | |
|---|---|---|---|
| 2,854,238 | 9/1958 | Kennell | 279/905 |
| 3,965,510 | 6/1976 | Ernst | 7/165 |
| 4,209,182 | 6/1980 | Sheldon | 279/75 |
| 4,551,875 | 11/1985 | Getz et al. | 7/158 |
| 4,791,690 | 12/1988 | Kuang-Wu | 7/158 |
| 4,900,202 | 2/1990 | Wienhold | 279/75 |
| 4,954,025 | 9/1990 | Crawford | 7/158 |
| 5,038,435 | 8/1991 | Crawford et al. | 7/158 |

FOREIGN PATENT DOCUMENTS 84665 3/1958 Denmark ........................... 7/165

Primary Examiner—Daniel W. Howell
Attorney, Agent, or Firm—Bacon & Thomas

[57] ABSTRACT

The present invention relates to a multi-functional drill and lock assembly comprising a drill cylinder, a drill pillar and a drill head. A convex tenon at the front end of the drill pillar is adapted to pierce through and sleeve with a guiding groove formed in the lock cylinder. By adjusting the position of the tenon within the guiding groove, a drill head secured to the front end of the drill pillar can be shifted so as to extend beyond or retract within the lock cylinder. The front end of the drill cylinder is formed with a screw locking hole to enable the tool to perform a dual-function. The drill head is removably secured to the drill pillar by a steel shot extending from the lock cylinder, through the drill pillar and into a shot groove formed as part of the drill head.

3 Claims, 6 Drawing Sheets

MULTI-FUNCTIONAL DRILL AND LOCK ASSEMBLY

FIELD OF THE INVENTION

The present invention relates to the design of a multi-functional drill and lock assembly. Owing to the design of its unique structure, it not only enables drilling and screw locking to be processed more readily, it also simplifies its integral structure. When compared with a conventional one, the drill and lock assembly is found to be more economical in its production cost as well as having a longer life. It is tool noted for its multiple functions and practicality.

BACKGROUND OF THE INVENTION

When drilling or locking a screw into an object, an inner hole is usually drilled in the object with an electric drill. The, a screw nut is driven into the hole with a hammer. The screw nut is often fixed inside the hole with a spanner, and thus prevented from loosening. Finally, a screw is threadably attached to the screw nut. In this process, the screw will be firmly locked. As several hand tools will have to be used alternately to achieve these drilling and screw locking operations, not only is time and labor wasted, but this process is not practical. Therefore, such a known process has been gradually replaced by utilizing some other advanced tools.

As shown in FIG. 7, a more advanced tool assembly is presented which comprises a lock cylinder formed by front and rear sections 1 and 2, a drill pillar 3 which can be sleeved within a drill head and the lock cylinder, a steel shot B and a steel shot buckling ring C. By sleeving drill pillar 3 into the lock cylinder, as well as making use of the steel shot buckling ring C, which is set on the surface of the lock cylinder to exert a packing force onto steel shot B to further force it to move into a steel shot groove 31 of drill pillar 3 inside the lock cylinder, drill pillar 3 can be fixed in a desired axial position. However, an axially extending plane 36 is cut on the surface of drill pillar 3 to coordinate with a positioning edge 24 at the rear end of the lock cylinder. When drill pillar 3 is moved forward, a drill head carried by drill pillar 3 can extend out of the lock cylinder for use in a drilling process. A circular arc 38 and a secondary positioning plane 37 are set on the extreme end of plane 36 of drill pillar 3. When drill pillar 3 is being pulled in a counter direction along the lock cylinder such that the drill head will be recessed within the lock cylinder, the lock cylinder will be able to rotate along the circular arc 38. While it moves to secondary positioning plane 37 which corresponds in position to positioning edge 24 of the lock cylinder, drill pillar 3 will not be able to move forward because it is checked by secondary positioning plane 37. This will enable the special pattern 11 at the front end of the lock cylinder to protrude for engagement with a packing screw.

With this construction, the aforesaid conventional structure has been found to be able to achieve the object of rapid drilling and locking by using an ordinary electric drill, to the ultimate effect of shortening the working hours required and saving labor.

After carefully studying the structure of the prior art, however, the inventor found that in the installation of the aforesaid tool assembly which is featured for its rapid changes, drill pillar 3 must first be sleeved into the rear lock cylinder 2. Then, the front lock cylinder is secured to the rear lock cylinder 2 to enable drill pillar 3 to be sleeved into the lock cylinder. After that, steel shot buckling ring C and steel shot B are fixed onto the outer periphery of the lock cylinder. Owing to this complicated assembly procedure the prior art suffers from the following:

a. The complexity of its members makes the assembling process troublesome and time consuming. Moreover, the plurality of parts and the complexity of its structure also increases the cost of its material. Besides increasing its retail price, this cost factor will further result in weakening its market competitiveness.

b. The plurality of members makes its assembling process troublesome and uneasy. The difficulty experienced by ordinary people in understanding its assembling process also causes disturbances.

Furthermore, since plane 26 is cut into drill pillar 3, the average diameter of drill pillar 3 is shortened. Therefore, when drill pillar 3 receives a considerable pressure during use, it will usually break because it cannot sustain the load. In addition, when the secondary positioning plane 37 at the front end of drill pillar 3 is rotated at positioning edge 24 which is located at an extreme end of the lock cylinder, deformation can easily result due to the effect of a powerful torsion being exerted for a long time to the electric drill, as well as the application of stress. When the deformation of plane 37 exceeds the internal diameter of the lock cylinder, it will be impossible for drill pillar 3 to axially slide within the lock cylinder, thus making it impossible to perform its drilling function. Therefore, this conventional technique is considered to be incomplete in its structural design, and further improvement is deemed necessary.

SUMMARY OF THE INVENTION

The main object of the present invention is to make use of the design of an integrally formed hollow lock cylinder. On the hollow lock cylinder, a longitudinally extending positioning/guiding groove is formed. A convex tenon protrudes radially from a drill pillar, which is substantially cylindrical in shape. When the drill pillar is inserted through one end of the lock cylinder, the convex tenon extends into the positioning groove to enable front and rear axial positioning of the drill pillar within the positioning groove, so as to provide a rapid changing, two-section assembling tool for hole drilling and screw locking functions. While the convex tenon enables the drill pillar to be adjustable within the lock cylinder, so as to further prevent the drill pillar from being shifted relative to the lock cylinder at the time of operation, the positioning/guiding groove is formed with transverse housing grooves at its longitudinal ends to receive the tenon. In general, the functions of the present invention are as follows:

1. Due to it simple construction and ease of assembly, use of the multi-functional drill and lock assembly reduces processing cross, to the ultimate effect of increasing its production efficiency and capacity.

2. With few parts, it is simple to assemble the finished product. All one has to do is to pass the drill pillar directly through the inward guiding groove and sleeve it into the lock cylinder. Compared with the complex assembly required with the prior art tools, the easy operation of the present arrangement provides for a more convenient and rapid process.

3. As all the members of the present invention, e.g., the lock cylinder and drill pillar, are securely attached after assembly, a sound torsion resistance stress can be withstood in terms of its receiving of force exerted, thus increasing the useful life of the tool. At the same time, as the present invention makes use of the reciprocating, sliding movement of the convex tenon within the positioning/guiding groove, such a sliding motion will not be affected even if the convex tenon slightly wears due to operational forces being exerted on its two lateral sides in the axle direction. Therefore, the present arrangement provides a practical tool assembly which has a longer useful life than that of a conventional one.

Moreover, another object of the present invention lies in providing a brand new drill head and drill pillar assembly. A polygon-shaped front hole is formed in the drill pillar, along with a short groove at an appropriate position in a handle portion of the drill head. A shot hole pierces through the surface of the drill pillar, wherein a steel shot can be set. Upon sleeving of the drill pillar into the lock cylinder, the steel shot will project out of the shot hole and into the shot groove to achieve the object of a tight connection. However, perhaps its most outstanding advantage lies in the convenient mode of dismantling the tool wherein the drill head can be completely disassembled from the drill pillar without utilizing additional tools as is required by a conventional one. This helps give the present invention practical structural design.

In order to allow a better understanding of the structure, features and other objects of the present invention, a detailed description coordinated with the related drawings is set forth below.

BRIEF DESCRIPTION OF THE DRAWINGS

FIG. 2-1 is a partial, cross-sectional view of the present invention in a first operational position.

FIG. 2—2 is a partial, cross-sectional view of the present invention in a second operational portion.

DETAILED DESCRIPTION OF THE INVENTION

Figure 1:
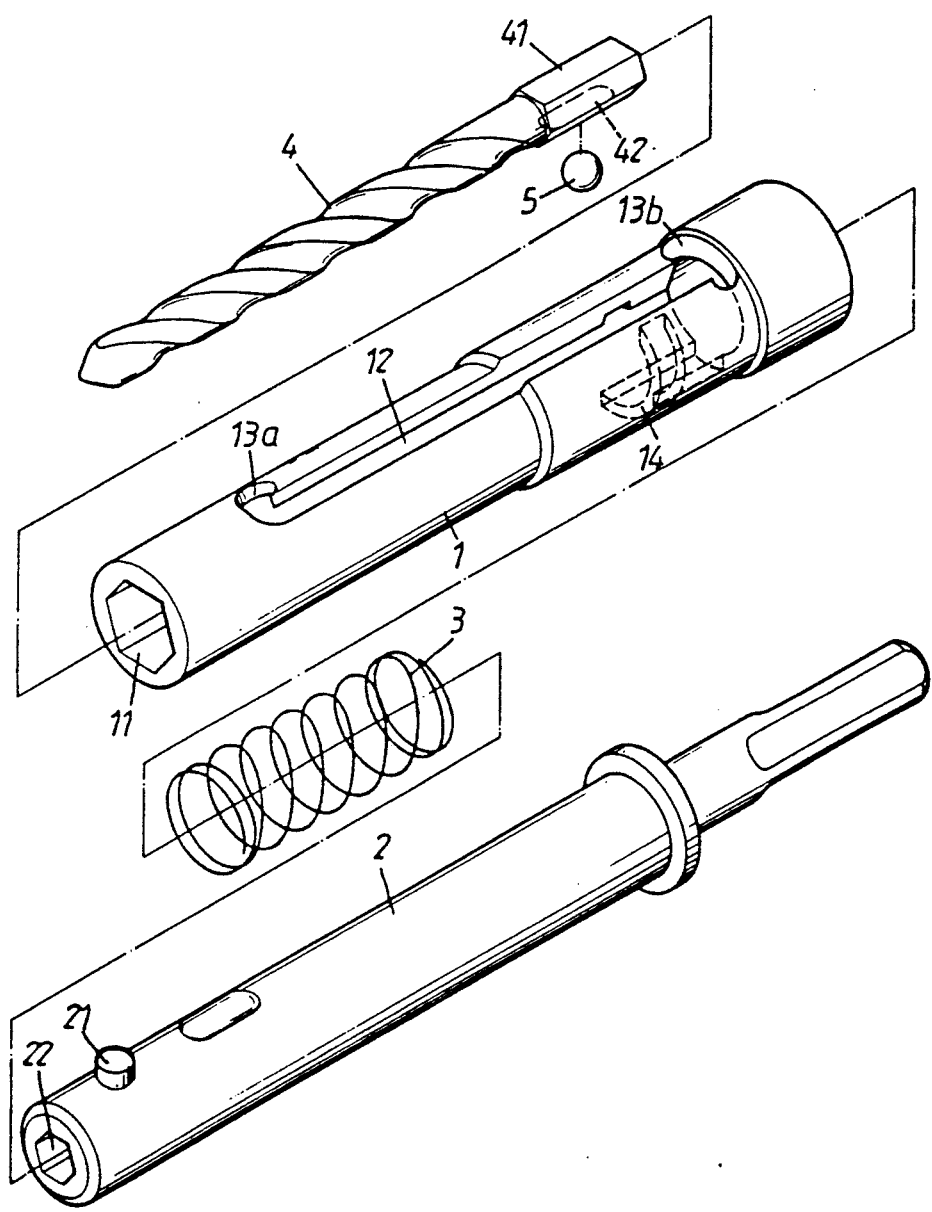
FIG. 1 is an exploded view of the multi-functional drill and lock assembly of the present invention.

First of all, please refer to FIG. 1, the multi-functional drill and lock assembly of the present invention comprises a lock cylinder 1, a drill pillar 2, a spring 3 and a specially designed drill head 4. The lock cylinder is made in a hollow circular shape, with a specially formed hole 11 at its front end which is adapted to match the shape of a conventional screw head (not shown). The surface of lock cylinder 1 is formed with a longitudinally extending guiding groove 12 which opens into the hollow interior of lock cylinder 1. Guiding groove 12 is formed with positioning housing grooves 13i a, 13b extending transverse to guiding groove 12 at the two ends of guiding groove 12. An internal guiding groove 14 defining a vertical passage is formed along an internal annular plane on the middle section of guiding groove 12 to connect with lock cylinder 1, so as to facilitate the passing through of drill pillar 2 within lock cylinder 1. Drill pillar 2 generally comprises a cylindrical pillar having a thinner ore reduced diameter section at it rear end defining a clamping head which is adapted to be locked to an electric drill. Drill pillar 2 further includes a thicker section, with a drill head receiving hole 22 at its front end, adapted to be received within lock cylinder 1. A radially projecting, convex tenon 21 is formed on the front end of drill pillar 2. When drill pillar 2 is received within lock cylinder 1, it thicker section is slidably received within guiding groove 14 of lock cylinder 1 with tenon 21 projecting into guiding groove 12. Moreover, a compressing spring 2 is sleeved beforehand onto the thicker end of drill pillar 2. Upon the time of sleeving drill pillar 2 into lock cylinder 1 and housing convex tenon 21 into the front positioning/housing groove 13a, lock cylinder 1 and drill pillar 2 will be compactly connected without loosening because of the functioning of spring 3.

Figure 3:
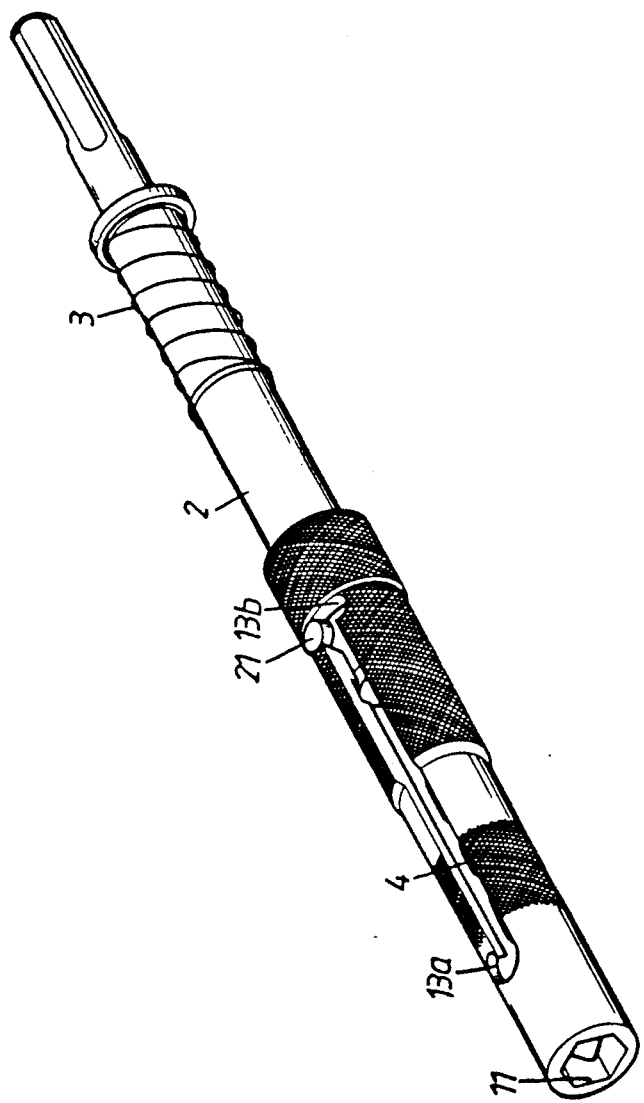
FIG. 3 is a perspective view of the present invention in a first assembled position.
Figure 4:
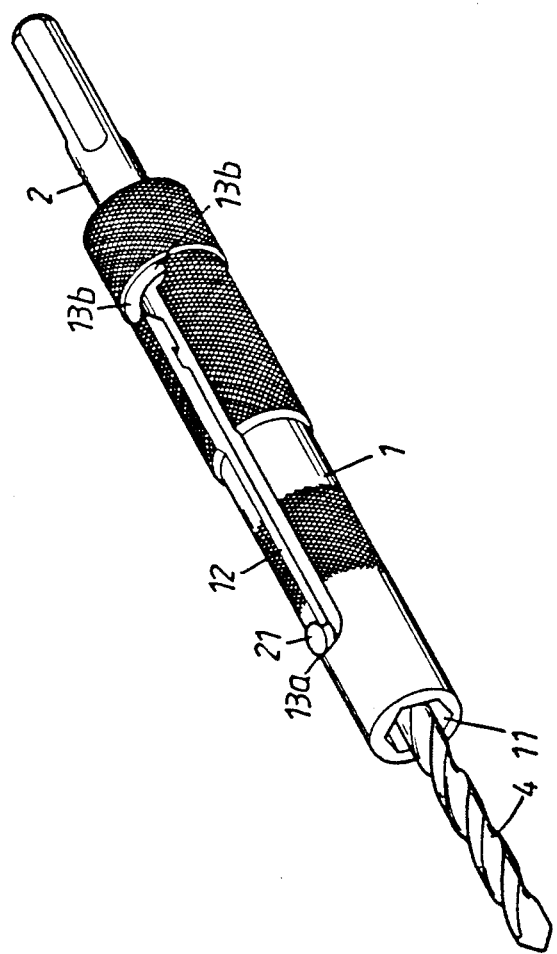
FIG. 4 is a perspective view of the present invention in a second assembled position.

Owing to the connection of the aforementioned lock cylinder 1 and drill pillar 2, drill pillar 2 will be slidably shiftable relative to lock cylinder 1. By means of the design of positioning/housing grooves 13a, 13b, drill pillar 2 can be operatively locked relative to lock cylinder 1 in at least two positions. This shifting arrangement enables drill head 4 to expand out of and contract into lock cylinder 1 or for forming hole 11 at the front end of lock cylinder 1 to be available to lock a screw into a hole. Please refer to FIGS. 3 and 4 for the changes which occur to the assembly as lock cylinder 1 is shifted relative to drill pillar 2.

Figure 2A:
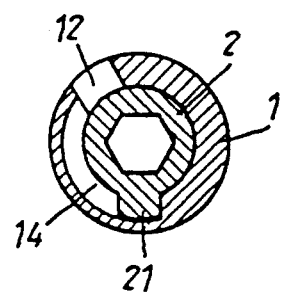
Figure 2B:
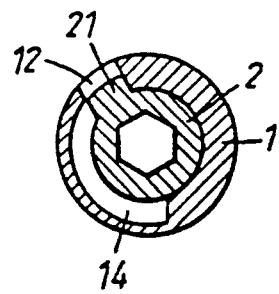

Referring to FIG. 2-1, wherein ti can be seen that convex tenon 21 of drill pillar 2 is pushed inward along inward guiding groove 14 at the rear end of lock cylinder 1. For the purpose of preventing drill pillar 2 from slipping accidentally out from inward guiding groove 114 after assembling, inward guiding groove 14 extends from the middle section of guiding groove 12 of lock cylinder 1 along the internal annular plane of lock cylinder 1 and protrudes out of lock cylinder 1. This enables convex tenon 21 of drill pillar 2 to be pushed inward in an axial direction along the exit end of inward guiding groove 14 of lock cylinder (as indicated in FIG. 2—2), thus completing the connection of lock cylinder 1 with drill pillar 2. On the contrary, if lock cylinder 1 and drill pillar 2 have to be dismantled, convex tenon 21 of drill pillar 2 can be pushed into inward guiding groove 14 at the middle section of guiding groove 12 and then drill pillar 2 can be pulled in a counter direction out of inward guiding groove 14. Forming guiding groove 14 at the middle section of guiding groove 12 of lock cylinder 1 does not affect the function of positioning drill pillar 2 inside lock cylinder 1. Therefore, from both an installation or dismantling standpoint, the present invention is able to provide a convenient and rapid mode, thereby providing an advanced and practical design.

Figure 5:
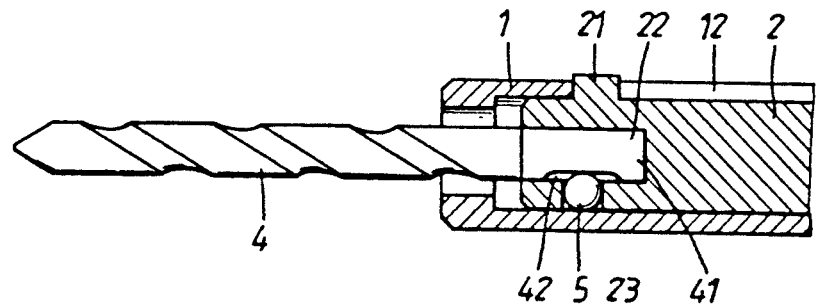
FIG. 5 is a cross-sectional view of a first embodiment of the drill head dismantling structure of the present invention.

Please further refer to FIGS. 1 and 5, wherein the connection of drill head 4 and drill pillar 2 according to the present invention is indicated. As illustrated, the handle 41 of drill head 4 is made in the shape of a polygon (a hexagon is used as an example in the present case). The drill head receiving hole 22 formed in the front end of drill pillar is also made in the shape of an internal polygon hole (a hexagon hole is sued as an example in the present case), so as to enable drill head handle 41 to be sleeved into drill head hole 22. A shot groove 42 is formed at an appropriate position on the surface of drill head handle 41. In a corresponding position, a shot hole 23 pierces through drill pillar 2 (in this case, the most appropriate position would be having it set in a counter-direction of the convex tenon 21). A steel shot 5 is placed in shot hole 23 s that it may be housed into shot groove 42 on drill head handle 41. When drill pillar 2 is sleeved and sliding within lock cylinder 1, steel shot 5 protrudes beyond drill pillar 2 so as to secure drill head 4 within drill head receiving hole 22 due to a squeezing force exerted against it by the inner wall of lock cylinder 1. The most remarkable advantage of this design lies in the fact that no other tools will be needed when drill head 4 is being dismantled. In addition, after separating drill pillar 2 from lock cylinder 1, drill head 4 can be pulled out easily from drill head receiving hole 22 of drill pillar 2. This is regarded as very practical and convenient.

Figure 6:
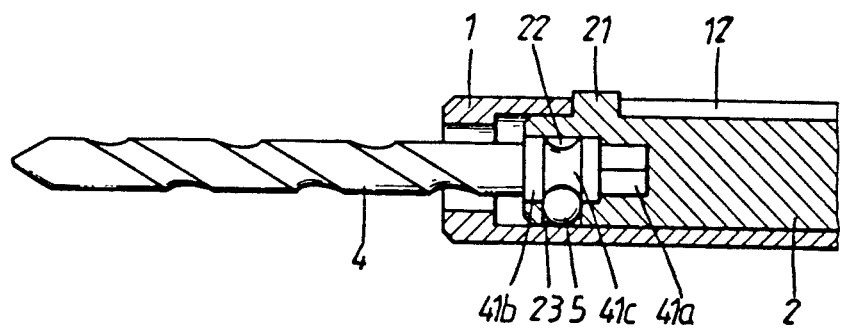
FIG. 6 is a cross-sectional view of a second embodiment of the drill head dismantling structure of the present invention.
Figure 7:
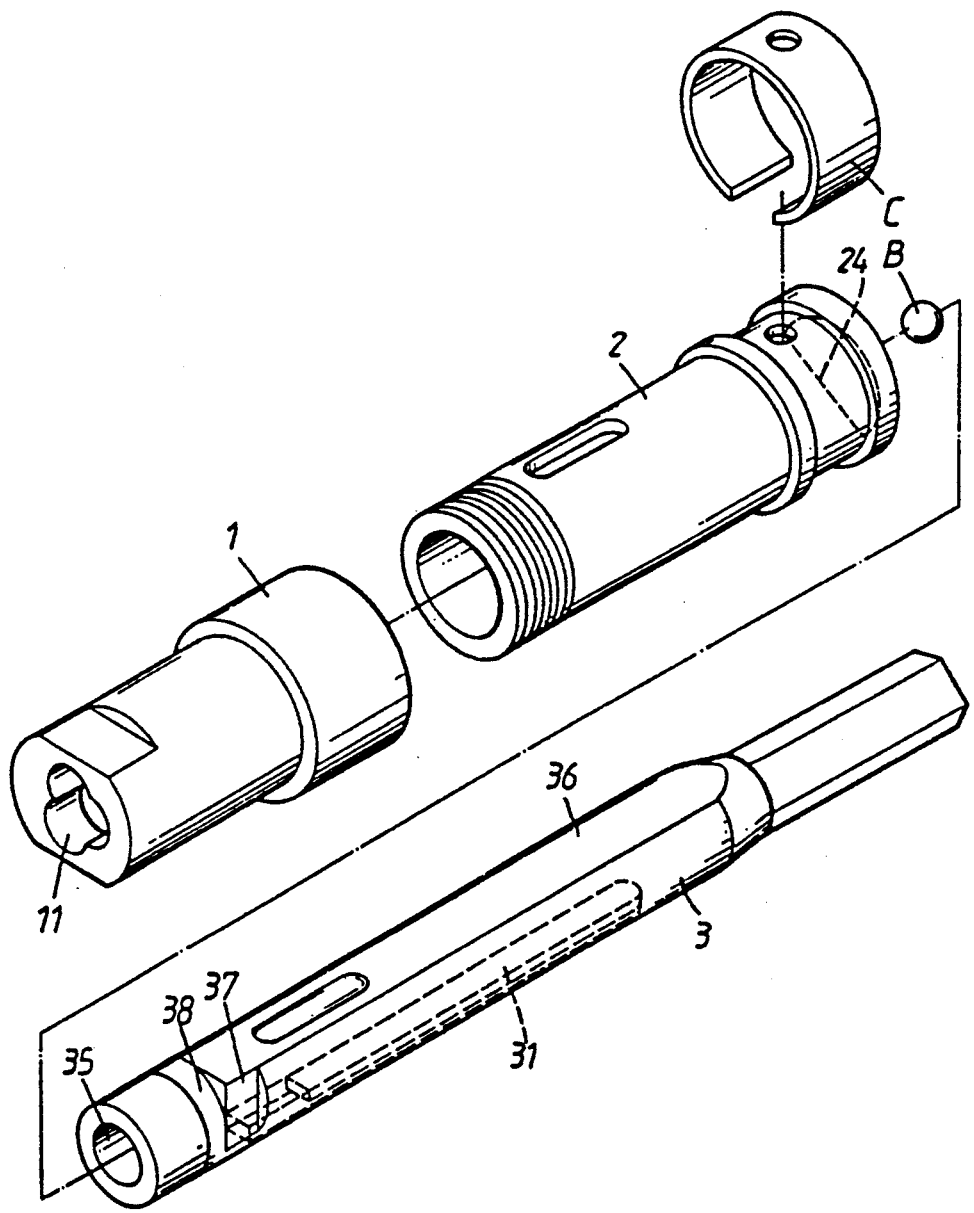
FIG. 7 is the an exploded view of a drill and locking tool of the prior art.

Furthermore, FIG. 6 shows another preferred embodiment of the present invention wherein the ainu drill head and drill pillar assembly can be substituted by another mode. That is to say, the mode of the handle 41 can be designed in such a way that its extreme end is made into a polygonal pillar end 41a. Adjacent end 41a, handle 41 is formed with a pair of spaced, smooth circular pillars 41b having enlarged outer diameters. A shot groove 41c is thereby formed between circular pillars 41b. On the other hand, a mold similar in shape to that of this drill head handle is also formed at the front drill head receiving hole 22 of drill pillar 2 for inserting and sleeving of drill head handle 41. A shot hole 23 extends through drill pillar 2 and is aligned with shot groove 41c. Similar to the FIG. 5 embodiment, after the insertion and sleeving of drill pillar 2 into front drill head receiving hole 22, steel shot 5 will extend through shot groove 23 and into shot groove 41c of drill head handle 41. Again, when drill pillar 2 is sleeved into lock cylinder 1, drill head 4 will be tightly fixed in the interior of drill pillar 2 by means of the functioning of the internal wall of lock cylinder 1.

Summarizing the above description, it can be seen that the multi-functional drill and lock assembly provided by the present invention can achieve the effect of being easy to operate, good in quality and allowing a longer useful life than the known prior art arrangements. For those who are familiar with the prior art, a lot of modification and rectification can be made to the preferred embodiments based on the above descriptions. However, this shall not deviate from the scope and spirit of the present invention. Therefore, the present invention is only intended to be limited by the scope of the following claims.

I claim:

1. A multi-functional drill and lock assembly adapted to be removably secured to a drill comprising:
    a longitudinally extending hollow lock cylinder including first and second ends, an outer surface formed with a longitudinally extending guiding groove and an inner surface formed with an internal guiding groove, said longitudinally extending guiding groove opening into said hollow lock cylinder and terminating in first and second ends formed with respective positioning/housing grooves that extend substantially transverse to a longitudinal axis of said longitudinally extending guiding groove, said internal guiding groove extending from the second end of said lock cylinder to an arcuate guiding portion that opens into said longitudinally extending guiding groove, the first end of said hollow lock cylinder including a hole shaped to non-rotatably receive a head of a screw;
    a longitudinally extending, substantially cylindrical drill pillar having a first end formed with a longitudinal extending drill head receiving hole and a second end adapted to be removably secured within a drill, said drill further including an outer surface formed with a radially extending tenon adjacent the first end of said drill pillar and an annular, enlarged diameter portion adjacent the second end thereof;
    a drill head removably secured within said drill head receiving hole; and
    a compression spring having first and second ends and being sleeved about said drill pillar, the second end of said compression spring being adapted to engage said enlarged diameter portion of said drill pillar, wherein said drill pillar and said drill head are adapted to be received within said lock cylinder with said tenon initially projecting into said internal groove and then being rotated so as to project into said longitudinally extending groove so that said lock cylinder can slide relative to said drill pillar to enable said drill head to either project beyond the first end of said lock cylinder with said tenon being located in the positioning/housing groove formed at the first end of said longitudinally extending groove or to retract within said lock cylinder with said tenon being located in the positioning/housing groove formed at the second end of said longitudinally extending groove and said compression spring extending between the enlarged diameter portion of said drill pillar and the second end of the lock cylinder.

2. The multi-functional drill and lock assembly of claim 1, wherein said drill head includes a handle portion which is polygon-shaped in cross-section and said drill head receiving hole is also polygon-shaped, said handle portion being formed with a shot groove and said drill pillar being formed with a shot hole extending therethrough, said drill and lock assembly further including a shot which is adapted to removably secure said drill head within said drill head receiving hole by extending from the inner surface of said lock cylinder, through said shot hole, and into said shot groove.

3. The multi-functional drill and lock assembly of claim 1, wherein said drill head including a handle portion having an end which is polygon shaped in cross-section, a pair of diametrically enlarged spaced annular pillar members adjacent said end and a shot groove formed between said annular pillar members, said drill head receiving hole also being polygon-shaped and said drill pillar including a shot hole extending therethrough, said drill and lock assembly further including a shot which is adapted to removably secure said drill head within said drill head receiving hole by extending from the inner surface of said lock cylinder, through said shot hole, and into said shot groove.

* * * * *